Aug. 2, 1960

J. H. FLANAGAN 2,947,206

SELF-LUBRICATING TREPANNING DRILL

Filed Oct. 13, 1959

INVENTOR.
J. H. FLANAGAN
BY
ATTORNEY ated Aug. 2, 1960

2,947,206
SELF-LUBRICATING TREPANNING DRILL

James H. Flanagan, 14 Pinebrook Road, Wayland, Mass.

Filed Oct. 13, 1959, Ser. No. 846,217

8 Claims. (Cl. 77—55)

(Granted under Title 35, U.S. Code (1952), sec. 266)

The invention described herein may be manufactured and used by or for the Government of the United States of America for governmental purposes without the payment of any royalties thereon or therefor.

The present invention relates generally to metallurgical apparatus and more particularly to a self-lubricating trepanning drill for forming test specimens, the internal stress conditions of which can be directly analyzed to provide an indication of the nature of the residual stress state in the parent metallic structure in which these specimens are produced.

Heretofore, the residual internal stresses present in solid structures and the like have been investigated by X-ray diffraction techniques or by destructively machining the structure. The high initial cost of the equipment, the limited areas of the structure whereat the analysis may be performed because of radiation hazards, the need for specially trained operators, and the difficulty of interpreting the data are some of the more prominent drawbacks of the X-ray diffraction method which have limited its utilization. Besides the above disadvantages, the accuracy obtained by the X-ray technique is generally only about plus or minus ten percent of the stress level being measured. The X-ray diffraction method is further restricted to analysis of the stress system contained in surface layer of the order of hundreds of angstroms in thickness. Subsurface stresses cannot be evaluated because of the limited penetration capability of obliquely impinging X-rays.

The disadvantages of the destructive machining process lie almost wholly in the obvious fact that after the analysis is carried out the structure has been destroyed. Only by inference can the residual internal stress system in a similar structure be estimated. However, recently a new method has been devised for measuring the state of residual internal stress in solid structures which results in only a limited disfigurement of the surface of the structure under examination. Basically, this technique involves preparing small, free-standing, cylindrical specimens with an undisturbed attachment at its base to the parent material, in the surface of the structure and then testing these columns for their deflection versus mechanical load characteristic as a compression specimen. It is a simple matter, of course, to repair the damage to the surface after the test has been completed by simply filling in the small disfigurement with metal as by a welding operation. These test specimens, which may be in the order of one-eighth of an inch in diameter by one-half inch high, are difficult to form with conventional machine-tool equipment without at the same time heating or mechanically working the test column being prepared. Both of these phenomena disturb the system of internal stresses within the test column and, since their effect is difficult to estimate, even when they are taken into account in the analysis, the final results are oftentimes of doubtful validity. The free-standing columns can, of course, be simply produced by machining away selected portions of the surface material on a lathe in such a way as to leave an upstanding boss for the specimen. But since the surface is severely disfigured during the cutting operation, the disadvantages of this method are the same as those present in the destructive machining test.

According to the present invention, the free-standing column specimens are prepared by trepanning the solid structure with a hollow cored drill. During the drilling action, the temperature existing at the cutting interface is controlled so that it does not rise to a value that will disturb or distort the internal stress condition of the specimen. To achieve this temperature regulation, the drill is self-lubricating and, as the drilling operation proceeds, a flow of coolants and lubricants is automatically supplied to the critical area of the structure.

Unlike prior art systems where auxiliary pumping apparatus and other accessories are needed to cool the cutting area and flush the chips out, the present drill structure accomplishes these functions by utilizing in its operation the principle of a piston moving into a closed cylinder containing a high viscosity lubricating material. The considerable pressure developed by the moving piston acts to force the viscous material down past the clearance between the piston and the cylinder to the cutting area and then up into the back free space.

The drill of the present invention in its simplest embodiment takes the form of a hollow cored drill, plugged at its shank end to form a cylinder of the type just mentioned. Before the drilling operation is commenced, the core of the drill is filled with a low melting point, lubricating semi-solid, such as, for example, sulphurized petrolatum. As the drill advances into the workpiece, the free-standing column being formed becomes a moving piston which forces the solid petrolatum past itself via appropriate clearances to the bottom of the kerf where it cools the curring edge of the drill and is transformed into a liquid by the resultant heat absorption. Thereafter, it flows together with the metal chips to the free surface of the workpiece.

A primary object of the present invention is to provide a trepanning drill having a self-contained lubricating supply.

Another object of the present invention is to provide a trepanning drilling apparatus wherein the lubricant is contained within the drill itself and automatically directed to the cutting area during the drilling operation.

A still further object of the present invention is to provide a hollow trepanning drill which contains its own supply of lubricant.

A still further object of the present invention is to provide a self-lubricating trepanning drill wherein the lubricant is automatically supplied to the cutting area as a result of the advancement of the drill into the workpiece.

A still further object of the present invention is to provide an arrangement for lubricating a trepanning drill which does not require the need of remote auxiliary pumping apparatus and the like for forcing the lubricant down to the cutting area.

Other objects and many of the attendant advantages of this invention will be readily appreciated as the same becomes better understood by reference to the following detailed description when considered in connection with the accompanying drawings wherein.

Figure 1:
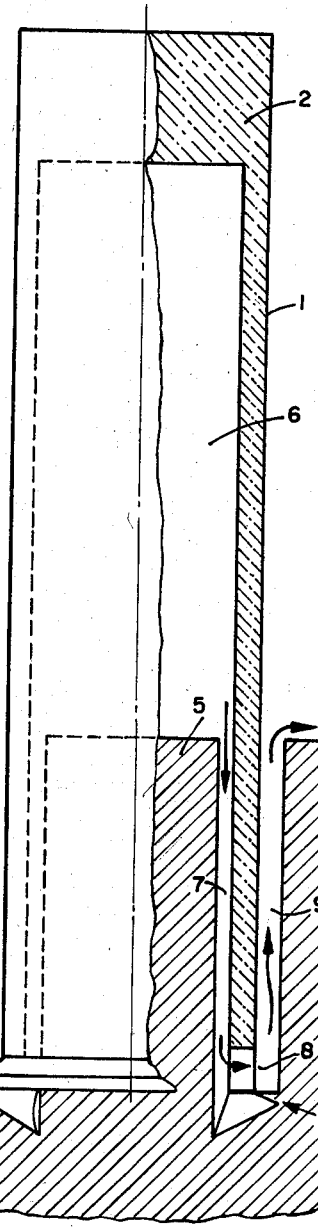
Fig. 1 is a partial section of a trepanning drill embodying the present invention.

Referring now to Fig. 1 of the drawings, the trepanning drill of the present invention preferably comprises an elongated, tubular shank 1 closed at one end 2, the end which cooperates with the drill collet, with an integral cutting head 3 at its other end. Before the drilling operation proceeds, the core of the drill is prepacked with a semi-solid or viscous lubricant 6, such as, for example petrolatum, which has a relatively low melting temperature to insure its conversion to a fluid by the heat generated at the cutting area. As the drill is advanced into workpiece 4, cutting head 3 forms a free-standing, cylindrical column 5, and this column, as mentioned hereinbefore, behaves as a moving piston to force part of the lubricant downward, as shown by the arrows, into the annular inlet passage 7 bounded by the inner wall of the shank and the outer wall of the cylindrical column. When the lubricant reaches the vicinity of the cutting head, the increased temperature existing thereat transforms it from a semi-solid to a fluid state and it flows under pressure to the cutting area and also through a space 8 between adjacent blades to the annular output passage 9 formed by the outer surface of the shank and the inner surface of the workpiece whence it emerges as a slurry with the cutting chips. The lubricant could be, for example, a sulphurized lime-soap-grease mixed with suitable quantities of water, sodium bicarbonate and potassium acid tartrate. This mixture when melted and worked near the region of the cutting action will liberate carbon dioxide gas to increase further the volume of cooling lubricant available for the trepanning operation.

Figure 3:
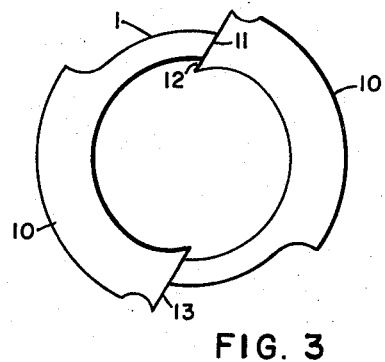
Fig. 3 is a bottom view of the cutter.
Figure 2:
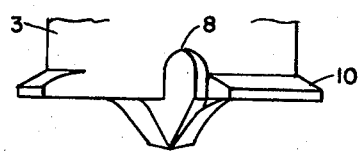
Fig. 2 is an elevation view showing the structural details of the cutting portion of the drill.

In the particular embodiment selected for illustration, the tubular shank is provided with a pair of arcuated shoulder portions 10, better seen in Figs. 2 and 3, and the cutting blades extend downwardly from these portions as a pair of descending, helical surfaces terminating in cutting edges 11. It will be appreciated, of course, that the specific configuration of the cutting head is solely a matter of design and, as such, its shape is governed primarily by the cutting characteristics and composition of the workpiece, the drilling speed and other well known factors. As far as the present invention is concerned, it is only necessary that there exist sufficient clearances to provide a suitable passage for the flow of the lubricant between the inner and outer passages referred to above at or near the cutting edges and other sources of machining heat. It will be recognized that the size and capacity of the inlet passage is governed by the extent to which the cutting edges project into the core of the drill, as best shown by reference character 12 in Fig. 3. Likewise, the size and capacity of the outlet passage is determined by the amount of the cutter that extends beyond the outer wall of shank 1, as shown by reference character 13.

Fig. 2 illustrates the details of a typical cutting head 3 and more clearly reveals one of the passages 8 near a cutting tooth through which the lubricant flows. Fig. 3 is a bottom view of the cutting head and depicts the relationship between the shank 1 and the descending, helical surfaces which, together with cutting faces 11, form the cutting head.

Figure 4:
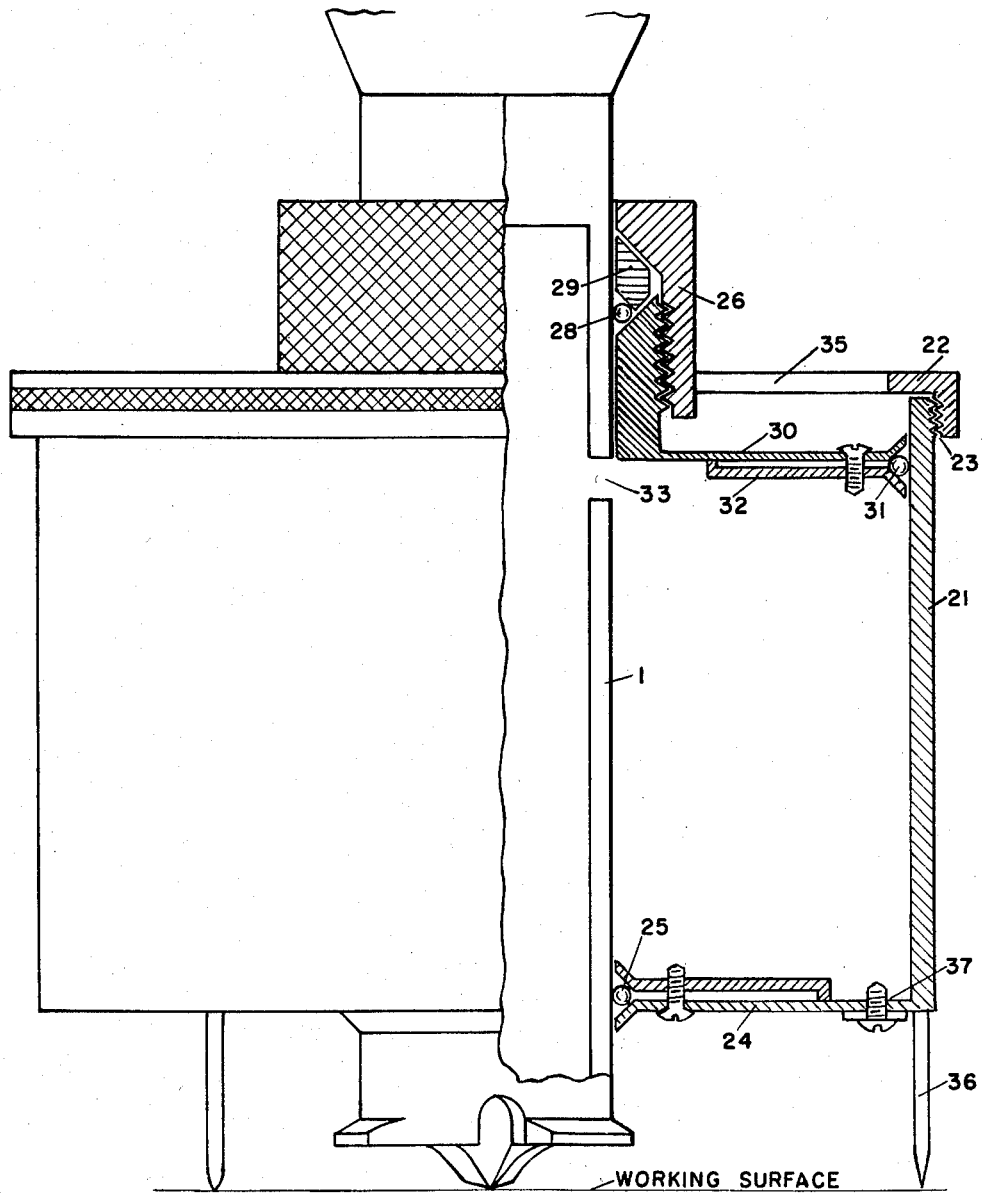
Fig. 4 is a partial section of the drill of Fig. 1 provided with an auxiliary reservoir for increasing the flow of lubricant to the cutting area.

Fig. 4 illustrates an arrangement for increasing the amount of lubricant available at the cutting area in the case where the supply from the core of the drill is considered inadequate. In this modification a hollow, cylindrical reservoir, generally represented by reference character 20 and consisting of a cylindrical wall section 21 closed at one end with an apertured retaining cap 22 affixed thereto by cooperating threaded sections 23 and at the other end by a base portion 24 which contains a central circular opening bounded by an O ring seal 25, fits about the body of the trepanning drill of Fig. 1. Secured to the shank by means of lock nut 26, slit locking ring 27 and an O ring pressure seal 28 is a circular piston member 30. The outer edge of this member terminates in an O ring slide seal 31 which abuts the inner wall of the reservoir and is kept in place by a lower retaining plate 32. A plurality of communicating ports 33 are formed about the circumference of the drill shank to permit the lubricant to flow from the reservoir to the core of the drill when the relative pressures in these spaces favor this transfer. In the normal operation of the apparatus, the core of the drill is first prepacked with lubricant. The reservoir is next placed in position with retaining cap 22 and piston 30 detached. The reservoir is packed with lubricant and the above components then secured in place. It will be appreciated that as the drilling operation proceeds rotating piston 30 moves downwardly by the same amount that the cutter advances into the workpiece. However, the change in the volume of the reservoir due to the above piston movement is considerably greater than the change in volume of that portion of the core of the trepanning drill which is unoccupied by the free-standing column being formed. This inequality, of course, is due to the relative dimensions of the volumes of the spaces being changed. Thus, lubricant flows from the reservoir through ports 33 to the core of the drill where it is available to lubricate and cool the cutting area.

In order to allow the drill collet to enter the reservoir space, retaining cap 22 has an annular opening 35. Also, the reservoir assembly is supported away from the workpiece on suitable legs, such as 36, to permit the operator to inspect readily the cutting head during the drilling operation. Base plate 29 contains an air vent 37 which is open during the filling operation and closed at all other times.

It will be readily appreciated that the hollow trepanning drill and the free-standing cylindrical column may be thought of as constituting a force pump, the reservoir of which may be readily refilled as necessary during the preparation of a given column specimen. Also, it will be understood that the filling operation may be carried out by gravity feed from an external source. Likewise, it will be appreciated that the high pressure required to force the chips from the bottom of the kerf will be supplied by the design of the drill.

Obviously many modifications and variations of the present invention are possible in the light of the above teachings. It is therefore to be understood that within the scope of the appended claims the invention may be practiced otherwise than as specifically described.

What is claimed is:

1. A machine tool for use in preparing free-standing cylindrical columns in solid materials comprising a trepanning drill, said drill having a hollow shank portion, said shank portion being solid at one end, a cutting head integrally formed in the other end and a high viscosity lubricant packed within the hollow portion of said shank.

2. A machine tool for forming free-standing cylindrical columns in solid materials for stress analysis purposes comprising, in combination, a trepanning drill, said drill having a hollow core, a cutting head at one end and a solid portion at the other end and a semi-solid lubricant packed within said hollow core, said lubricant being forced to the cutting area by the piston action of the free-standing column formed when the drill advances into the solid material.

3. In a method of machining free-standing columns in solid materials for stress analysis purposes, the step of drilling said solid material with a hollow cored trepanning drill which has packed within its core a semi-solid lubricant, which lubricant is forced down to the cutting area by the pressure built up within said hollow core by the entrance therein of the cylindrical column formed during the drilling operation, said lubricant being transformed into a fluid by the heat generated at the cutting area and carrying off the cutting chips.

4. Apparatus for machining free-standing cylindrical columns in solid material for stress analysis purposes comprising a trepanning drill, said drill being provided with a hollow core, a cutting head at one end and a plugged portion at the other end and means responsive to the advancement of said drill into said solid material and the formation of a free-standing cylindrical column for forcing a semi-solid lubricant down to the cutting area, said lubricant changing to a fluid because of the temperature existing at the cutting area and carrying off the cutting chips.

5. Apparatus for forming free-standing cylindrical columns in solid materials comprising, in combination, a hollow cored trepanning drill, means responsive to the advancement of said drill into said solid and the resultant formation of a free-standing cylindrical column for forcing a highly viscous lubricant down between the outer wall of said cylindrical column and the inner wall of said hollow cored drill to the cutting area, said lubricant changing to a fluid as a result of the increased temperature encountered at this area and being forced upwardly between the outer wall of said hollow cored drill and an adjacent cylindrical wall surface of said solid to the free surface of said solid.

6. Machine tool apparatus for forming free-standing cylindrical columns in a solid comprising, in combination, a trepanning drill, said drill having a hollow shank portion, one end of said shank portion terminating in a solid piece, the other end of said shank portion terminating in an integrally formed cutting head, a high viscosity lubricant packed within the hollow shank portion of said drill, said high viscosity lubricant being forced downwardly during the drilling operation between the inner wall of said hollow shank portion and the outer wall of the free-standing cylindrical column being formed to the cutting area, thereby to lubricate and cool said area, and means responsive to the advancement of said drill into the workpiece for supplying additional lubricant to the hollow shank portion of said drill.

7. In an arrangement as defined in claim 6 wherein said means for supplying additional lubricant to the hollow shank portion of said shank includes an auxiliary cylindrical reservoir packed with said lubricant, a piston member attached to the upper portion of said shank, a multiplicity of ports cut in the hollow shank portion of said drill below the point of attachment of said piston, said piston advancing into said reservoir as said drill enters said solid whereby a portion of the lubricant stored within said reservoir is forced through said ports into the hollow shank portion of said drill.

8. Apparatus for forming free-standing cylindrical columns in solids for stress analysis purposes comprising, in combination, a trepanning drill, said drill having a hollow shank portion, a hollow cylindrical reservoir, said reservoir having one end closed by a base plate which contains a central aperture, a piston member attached to the upper portion of said shank, the diameter of said piston being substantially equal to the inner diameter of said cylindrical reservoir, a high viscosity lubricant packed within said hollow portion and within said cylindrical reservoir, a multiplicity of apertures cut in said hollow portion below the point of attachment of said piston and means for positioning said reservoir with respect to said drill such that as said drill is fed into said reservoir, through said aperture and into the solid, said piston forces some of the lubricant packed within said reservoir through said apertures into said hollow portion, thereby to replenish the lubricant therein.

No references cited.